JOHN R. JARVIS,
INVENTOR
BY Hall & Houghton
ATTORNEY

JOHN R. JARVIS,
INVENTOR

BY Hall & Houghton
ATTORNEY 3,453,594

ELECTRICAL COMMUNICATIONS SYSTEMS

John Roy Jarvis, St. Albans, England, assignor to Her Majesty's Postmaster General, London, England Filed Oct. 11, 1966, Ser. No. 585,813
Claims priority, application Great Britain, Oct. 13, 1965, 43,445/65
Int. Cl. G08b 29/00
U.S. Cl. 340—146.1 9 Claims This invention relates to time division multiplex (t.d.m.) communications systems, and in particular to pulse code modulation (p.c.m.) communications system, in which information, for example speech, is coded in digital form for transmission.

Figure 1:
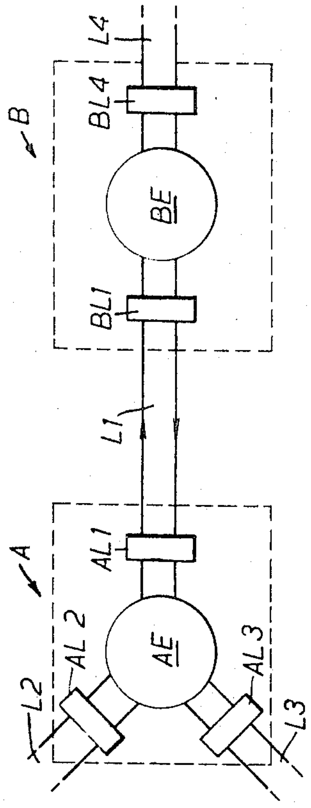

The invention is particularly concerned with the problem of ensuring synchronism between the time frames, and the time slots and digits contained therein, of incoming systems to a particular switching stage of a multichannel p.c.m. communications system. The present invention is concerned with means of so controlling the master oscillators of the switching stages of such a p.c.m. system that differences between the proportions of the total capacities of the stores associated with the interconnected switching stages, which are in use at any time to achieve sychronisation, are minimised.

According to the present invention, a switching stage for a t.d.m. communications system, e.g. a p.c.m. communications system, has a master timing oscillator the frequency of which is adjustable by D.C. control signals, digit storage means operable under control of the master timing oscillator and incoming digits to absorb differences between the incoming digit times and local digit times generated by the master timing oscillator, sensing means responsive to the state of fill of the storage means to generate first D.C. error signals the sign and magnitude of which are dependent on the said state of fill of the storage means, means operable to encode the error signals and to transmit the encoded signals in selected outgoing channel slots from the stage, means operable to receive and to convert to second D.C. error signals, encoded error signals from selected channel slots incoming to that stage, the said received error signals having an opposite sign to the D.C. error signals from which they derive, and means connected to add algebraically the first and second D.C. error signals to produce a composite D.C. error signal and to apply the composite error signal to a frequency control input of the master timing oscillator in such a sense that the composite D.C. error signal tends to be reduced to zero.

In a t.d.m. communications system, according to the invention, a plurality of interconnected switching stages each has a local master timing oscillator the frequency of which is adjustable by D.C. control signals, each switching stage including for each incoming path to that stage a separate digit storage means operable under control of the local master timing oscillator and of incoming digits to that stage on the path concerned to absorb differences between the incoming digit times and local digit times generated by the local master timing oscillator of that stage, each storage means having its own sensing means responsive to the state of fill of that storage means to generate first D.C. error signals the sign and magnitude of which are dependent on the said state of fill of that storage means, means operable to encode the first error signals generated by that sensing means and to transmit the encoded signals in selected outgoing channel slots to the outgoing path associated with that storage means, each incoming path to a stage further having means operable to receive and to convert to second D.C. signals, encoded error signals from selected channel slots on that incoming path, the said second error signals having an opposite sign to the first D.C. error signals from which they derive, and each incoming path having means connected to add algebraically the first and second error signals generated by and received by the sensing and receiving means of that incoming path to produce a composite D.C. error signal and to apply the composite error signal to a common frequency control input of the local master timing oscillator of the switching stage to which that incoming path is connected in such a sense that the resultant frequency change of the oscillator tends to reduce the composite D.C. error signal to zero.

The digit storage means can comprise a series of toggles into which digits are written at the incoming digit rate, being read out at the locally generated digit rate. The store is operated so that under means operating conditions, the digit store provides a delay equal to half a locally generated time slot period. With the store in this condition, the sensing means is arranged to generate a zero level first D.C. error signal whlist for storage delays greater than or less than the mean delay, the first D.C. error signal has, respectively, a positive or negative polarity and a magnitude dependent on the degree of storage delay increase or decrease.

The sensing means can, for example, operate by generating a square wave output having a 50:50 mark/space ratio in the mean condition of the digit storage means, the mark/space ratio increasing or decreasing proportionately with storage delay increases or decreases. The square wave output is converted by an integrator to a first D.C. error signal of appropriate magnitude and polarity.

The encoder means may conveniently utilise delta-sigma modulation techniques and generate an encoded first error signal consisting of alternate logical "1" and "0" signals which are transmitted to the outgoing path in local synchronising time slots when the first D.C. error signal has zero level. (The decoding means operates to convert such an encoded error signal received from the incoming line to a zero level second D.C. error signal.) When the delay storage of the local digit storage means increases from the mean condition, the first D.C. error signal becomes positive in polarity and the encoder generates and sends to the outgoing path a series of logical signals in sequential local synchronising time slots in which logical "0" signals predominate for a time dependent on the magnitude of the first D.C. error signal. (Such encoded error signals received by the local decoding means are converted to negative second D.C. error signals.) When the delay storage of the local digit storage means decreases from the mean condition, the first D.C. error signal becomes negative in polarity and the encoder generates and sends to the outgoing path in sequential local synchronising time slots a series of logical signals in which logical "1" signals predominate, again for a time dependent on the magnitude of the first D.C. error signal. (Encoded logical "1" error signals received by the local decoding means are converted into positive second D.C. error signals.)

Figure 2:
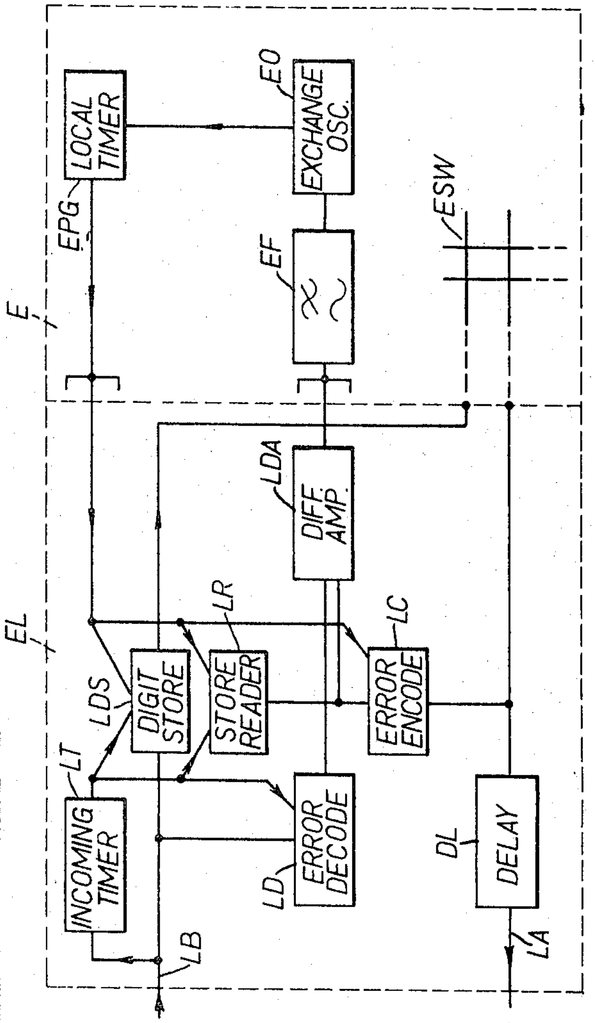
Figure 3:
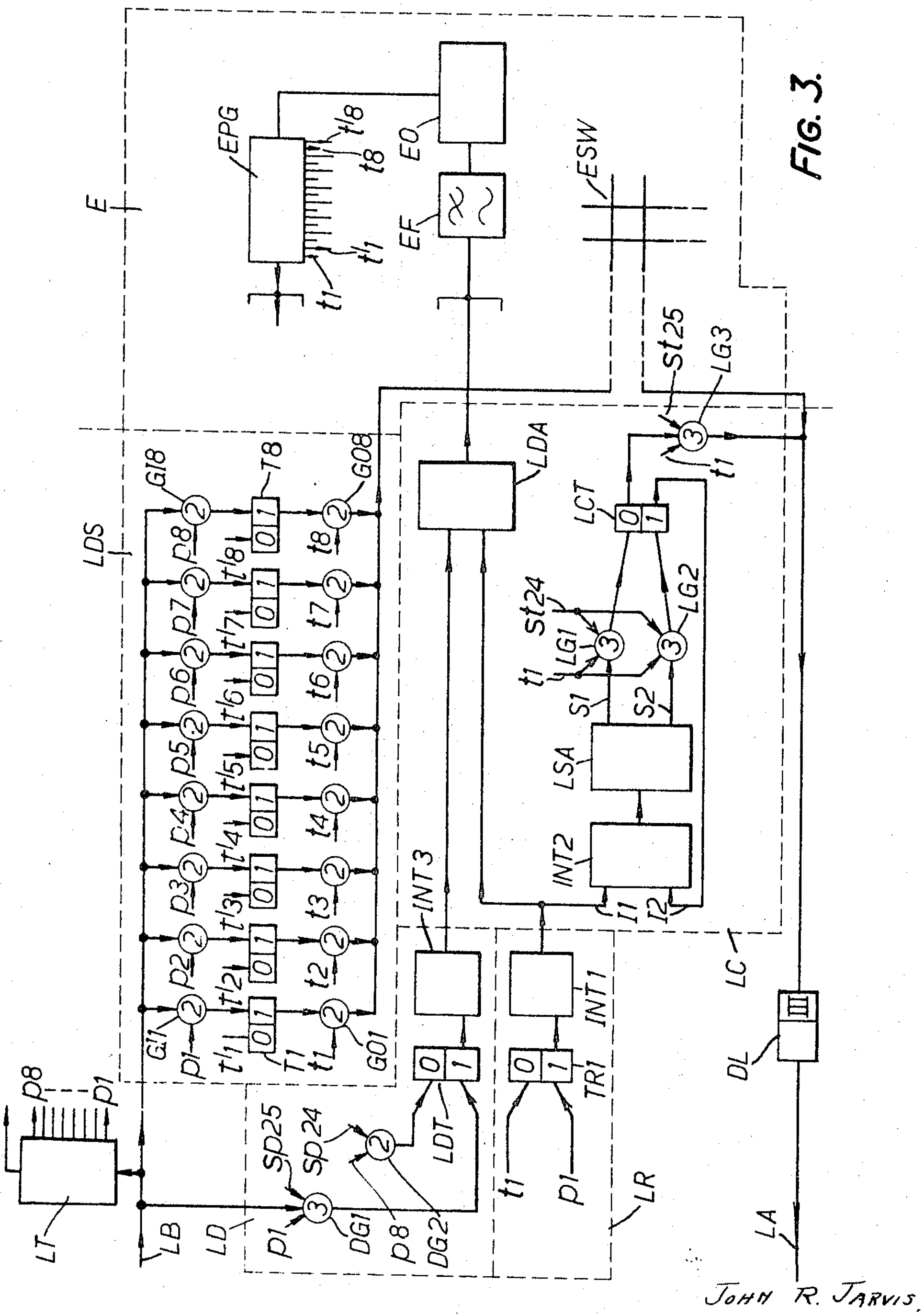

By way of example, the invention will be described in greater detail with reference to the accompanying drawings, in which:

FIG. 1 is a schematic drawing showing two interconnected switching stages forming part of a t.d.m. communications network utilising p.c.m. switching techniques, FIG. 2 is a block schematic diagram of part of one of the switching stages shown in FIG. 1 and illustrating the invention, and FIG. 3 is similar to FIG. 2 but illustrating certain components in more detail.

FIG. 1 illustrates part of a t.d.m. multichannel p.c.m. telephone system, there being shown two telephone exchanges (switching stages) A and B connected by a line L1, although the system as a whole normally will comprise more than two such exchanges interconnected by other lines such as lines L2, L3, L4. The exchange equipments AE and BE of the exchanges A and B, respectively, are common to all the lines directly connected to that exchange and additionally they have line equipments L individual to each line connected to it. Thus, in FIG. 1 exchange A has lines L1, L2, L3 connected to it each with its own line equipment AL1, AL2, AL3. Likewise exchange B has associated lines L1 and L4 with line equipments BL1 and BL4.

FIG. 2 shows parts of an exchange equipment E and of one of the line equipments EL relevant to the invention, it being understood that these equipments will include additional components as is normal practice in the art.

The digital exchange equipment E shown in FIG. 2 has a master local timing oscillator EO which operates at the digit pulse repetition frequency (p.r.f.). The operating frequency of the oscillator EO can be varied over a small range of control signals applied to a frequency control input of the oscillator via a low pass filter EF. The various timing waveforms required to operate the exchange are all derived from the oscillator EO by a pulse generator EPG and serve to determine the timing of the slots and of digits within the slots. For example, in a particular system, the exchange oscillator EO operates at a digit p.r.f. of 1.6 mc./s. and the sampling frequency is 8 kc./s. Each time frame has 25 time slots *st1* . . . *st25*, each of duration 5 μs. and in each time slot there are eight digit positions *t1* . . . *t8*. The time slot *st25* is used to convey "frame start" information in digit positions *t2* . . . *t8* whilst digit position *t1* of that time slot is used for synchronising purposes to be described later.

The exchange equipment also has a switching network ESW for switching transmissions to and from the exchange with or without slot changing, as may be required, for which purpose it is connected by appropriate means (not shown) as is known in the art, to the outgoing line LA of a transmission link L and via the line equipment EL to the incoming line LB of the link L.

In such a telephone system (or other digital communications system), transmission delays occur due to several factors and in order to maintain synchronisation between the digit p.r.f. generated by the oscillator EO of an exchange and the p.r.f. of digits incoming to that exchange, the line equipments EL have means for temporarily storing incoming digits, the storage delay being controlled by any timing differences between incoming digits and corresponding digit times generated by the local master timing oscillator.

Whilst, assuming a constant mean temperature of the link interconnecting two line equipments EL, the transmission delay is a known fixed delay, variable delays can be introduced due to variations in temperature of the link and due to variation in the frequency of the local master timing oscillators of the exchange interconnected by the link concerned. In order to achieve the synchronisation referred to above, there is provided in a communications system embodying the invention, a fixed delay and a variable delay for incoming digits to a line equipment. To this end, the maximum variable delay is computed from the transmission delay introduced by the link at a known temperature, the temperature coefficient of delay, the expected range of temperature variation and the permitted range of frequency variation of the master timing oscillator. The amount of fixed delay is selected such that the transmission delay, corrected to the mean temperature, plus half the maximum of the variable delay plus the fixed delay equals an integral number of time frames.

The fixed delay referred to in the preceding paragraph is depicted in FIG. 2 as a transmission delay element DL connected to the outgoing line LA and the variable delay is depicted as a digit store LDS forming part of the line equipment EL and to be described later in more detail.

The incoming line LB is connected via the digit store LDS to the exchange switching network ESW. Incoming digits on the line LB are written into the digit store LDS at the incoming digit p.r.f. under control of a timer LT and are read out of the store at the exchange digit p.r.f. under control of the pulse generator EPG, in order to achieve alignment between the incoming and locally generated digit pulse times. The timer LT responds to the frame start signal contained in digit pulse positions *t2* . . . *t8* of each synchronising slot *st25* and generates trains of pulses (including pulses *p1* . . . *p8* at the incoming digit pulse rate) locked to the frame start signal.

As mentioned above, the frequency of the oscillator EO can be varied over a small range, such variation being effected in a sense tending to maintain that oscillator in synchronism with the master oscillators of other exchanges to which the exchange equipment E is connected. Each line equipment EL has apparatus for generating D.C. error signals dependent on the state of fill of the digit store LDS and it is these error signals that are used in controlling the master timing oscillator EO. The arrangement is such that when the digit store LDS is half-full, the error signal is zero and increases in opposite sense amplitude as the store fills or empties. The state of fill of the digit store is read by a reader LR which generates this D.C. error signal and feeds it to a difference amplifier LDA, the output of which is connected to the filter EF. The error signal from the reader LR also is fed to an encoder LC which converts the error signal into digital form and transmits it over the outgoing line LA at pulse time *t1* in the synchronising slot *st25*. It will be appreciated that the outgoing line LA becomes at its remote end the incoming line to another line equipment of a different exchange which also generates and transmits such D.C. error signals. These coded error signals are received on line LB of the line equipment EL shown in FIG. 2 and converted into a D.C. error signal, having an opposite polarity to the D.C. error signal from which it was derived, by a decoder LD, the output of which is also fed to the difference amplifier LDA. The output from this amplifier is a combined D.C. error signal which is bandwidth limited by the filter EF and fed as a frequency control signal to the oscillator EO.

Before describing a typical construction of the components of the line equipment EL in more detail, the operation of the system as so far described will be explained.

The digit store LDS is so controlled by the timer LT and the pulse generator EPG that under normal operating conditions (i.e. mean temperature of the link L and in-phase relation between the master oscillators EO of the exchanges interconnected by the link L) it provides a delay to incoming digit pulses equal to half a locally generated slot period, so that the sum of the transmission delay (represented by the link delay and the fixed delay DL) and of the delay provided by the store LDS equals an integral number of time frames.

Under these conditions, the digit store reader LR generates a D.C. error signal of zero magnitude which is applied to the differential amplifier LDA and to the encoder LC. The encoder LC transmits this information to line at pulse time *t1* in the synchronising time slot *st25*. The line equipment connected to the remote of the link L also generates a zero magnitude D.C. error signal under these conditions which is encoded and transmitted over the line LB to the line equipment EL where it is converted back to a zero level D.C. signal by the decoder LC and fed to the amplifier LDA. The net result is that the amplifier LDA applies no control signal to the filter EF.

If now the mean operating temperature of the link L rises, whilst the oscillators EO at either end of the link EL remain in phase with coincident frame start signals, then since the transmission delays of the lines LA and LB are practically equal, there will be an equal increase in the transmission delay along both lines LA and LB, which delay increase will be compensated by the digit stores LDS in the two line equipments reducing the storage delay of incoming digits, i.e. the state of fill of the digit stores reduces from the half-full state. In these conditions, the readers LR of the two line equipments generate equal like polarity (say negative) D.C. error signals. Considering the line equipment EL, shown in FIG. 2, the reader LR generates a D.C. error signal that is applied to the amplifier LDA and also is encoded and transmitted to the line LA at pulse time *t*1 in time slot *st*25. The decoder LR receives a similar encoded signal from the line equipment at the remote end of the link L and generates a D.C. error signal of opposite polarity (i.e. positive) to that generated by the digit store reader of the remote line equipment. Thus, the amplifier LDA receives two equal magnitude input signals of opposite polarities and, again, no frequency control signal is fed from the amplifier to the filter EF.

Assuming again that the exchange equipment master oscillators at both ends of the link L are in-phase with coincident synchronizing time slots and mean temperature conditions exist along the link L. If now the phase of the master oscillator of the remote exchange equipment advances relative to that of the master oscillator EO of the exchange equipment E, then the storage delay provided by the digit store LDS of the time equipment EL will increase correspondingly to maintain alignment between incoming digit times and locally generated digit times whilst the digit store in the remote line equipment decreases the storage delay provided to incoming digits. This situation can arise due to phase advance of the remote exchange oscillator or/and phase retardation of the exchange oscillator EO, and the digit store readers cannot detect which condition exists but merely the sense of the relative phase shift. Thus, in the above conditions, the digit store reader LR generates a positive error signal proportional to the increase in delay from the mean condition that is provided by the digit store LDS. The remote digit store reader generates a negative error signal of equal magnitude.

The positive error signal generated by the reader LR is applied to the amplifier LDA and also encoded and transmitted to line LA in digit times *t*1 of synchronising time slots *st*25 until the reader LR again generates a zero level D.C. error signal. Each encoded error signal transmitted to the remote end line equipment arrives on line LB at the line equipment EL during pulse times *p*1 of incoming synchronising time slots *sp*25 from the remote exchange and is decoded by the decoder LD into a positive error signal (since it was derived from a negative error signal) of equal amplitude to that generated by the reader LR, and is also fed to the amplifier LDA. The amplifier LDA thus produces a control signal which is the sum of the equal amplitude error input signals and the control signal is fed over the filter EF to the oscillator EO to advance its phase. At the same time, the remote exchange oscillator receives a similar phase retarding control signal.

The above description has assumed that the two exchanges are connected only by the one link L whereas, normally, each exchange will have several line equipments EL, the difference amplifiers LDA of which all feed the filter EF. The effect of this arrangement is that when one exchange oscillator in a system of interconnected exchanges changes its phase, all other exchanges connected to it receive phase shifting signals but whereas those other exchanges only receive two error signals, one locally generated and one from the exchange oscillator that has changed in phase, the latter receives control signals from all exchanges connected to it (assuming no change in phase of those other exchange oscillators). These signals can be added toegther so that a greater correction is applied to the exchange oscillator that has drifted than is applied to the other directly connected exchange oscillators.

As mentioned previously, the digit store reader LR generates a zero D.C. signal when the store is half-full, a negative error signal when the fill of the store decreases and a positive error signal when the fill increases. The error signals increase linearly in magnitude until the store is empty or full when the error signal remains, respectively, at a constant negative or positive magnitude.

It will be appreciated that the changes of exchange oscillator phase are small in magnitude and that the rate of drift is slow. This is consistent with the manner of change in phase due to error correcting signals generated as described above which are applied to the exchange equipments over a number of time frames. Thus, there is no conflict between rate of drift of the exchange oscillators and rate of correction.

FIG. 3 shows, in more details, an embodiment of FIG. 2.

The digit store comprises eight toggles T1 . . . T8 having input gates GI1 . . . GI8 connected to the incoming line LB and output gates GO1 . . . GO8 connected to the exchange switching network ESW. The input gates GI1 . . . GI8 are primed at the incoming digit pulse rate by pulses *p*1 . . . *p*8 derived from the timer LT. Thus, incoming digit pulses on the line LB are passed by the respective gates GI1 . . . GI8 in their own pulse times and set the respective toggles T1 . . . T8. The digit pulses then are stored by the digit store LDS. The digit store output gates GO1 . . . GO8 are primed by pulses *t*1 . . . *t*8 at the locally generated digit rate, these pulses being derived from the exchange pulse generator EPG. The pulse generator also generates pulses *t*'1 . . . *t*'8 in the respective local digit periods but displaced from, and occurring after, the corresponding digit pulses *t*1 . . . *t*8. The pulses *t*'1 . . . *t*'8 are used to reset the toggles T1 . . . T8 after they have been read by the output gates GO1 . . . GO8, so that there is minimum delay between reading a toggle and resetting it in readiness for a fresh writing operation.

The digit store reader LR comprises a toggle TR1 which is set by pulses at the incoming digit pulse times *p*1 and reset by pulses at the locally generated digit pulse times *t*1. An output from the toggle, consisting of a square wave, is fed to an integrator INT1 which generates a D.C. signal the magnitude and sign of which depends on the mark/space ratio of the square wave input to the integrator. This D.C. error signal is fed as an input to the difference amplifier LDA and also as an input to the encoder LC.

The operation of the encoder LC is based on delta-sigma modulation techniques which have been described in an article in "Electronics," Jan. 25, 1963, by H. Inose and others, entitled, "New Modulation Technique Simplifies Circuits." The encoder has an integrator INT2 to which the output from the reader integrator INT1 is fed on input I1. The integrator INT2 also receives a second input signal on input I2, the nature of which will be explained later. The integrator INT2 subtracts the signal on input I2 from that on input I1 and feeds the difference signal to a slicer-amplifier LSA. The amplifier LSA has output leads S1 and S2; if the input to the slicer-amplifier is positive the outputs are a logical "1" on lead S1 and a logical "0" on lead S2, these outputs being reversed for a negative input to the slicer-amplifier. The outputs on leads S1 and S2 are applied and inputs to gates LG1 and LG2 each of which are primed at digit times *t*1 of the locally generated time slots *st*24 and applied as resetting and setting inputs, respectively, to a toggle LCT. The set output from the toggle is fed back as the input signal on input I2 to the integrator INT2 and the reset output is fed as an input to a gate LG3. This latter gate is primed at pulse times *t*1 of the locally generated synchronising time slots *st*25 and the output of the gate thus is transmitted over the outgoing line in the synchronising time slots, feeding digit store error signal information to the line equipment at the remote end of the line for decoding and use as exchange oscillator control signal derivation.

Consider a system incorporating the apparatus illustrated in FIG. 3 and connected by link L to similar remote apparatus. With the transmission link L at means operating temperature and the incoming digit rate equal to the local digit rate, the pulses $p^1 \ldots p^8$ generated by the timer LT are half a local time slot in advance of the locally generated digit times, and the digit store LDS introduces a half time slot delay to bring the pulses $p^1 \ldots p^8$ into alignment with corresponding ones of the locally generated digit pulse periods $t^1 \ldots t^8$. For example, an incoming digit pulse such as that occurring at pulse time $p^1$ (coincident with local pulse $t^5$) will be gated by input gate GI1 of the digit store LDS to set the toggle T1. The stored digit is read out from the toggle T1 four locally generated digit pulse periods (half a local time slot) later by priming gate GO1 at pulse time $t^1$. Thus, the digit store LDS is half-full and subjects incoming digits to a half-slot storage delay (referred to hereinafter as "Normal Delay Condition"). If the incoming digit rate should decrease (or the locally generated digit rate increase), then there is a correspondingly shorter delay between the occurrence of the priming pulses applied to the input and output gates of the respective toggles T1 . . . T8 and hence the storage delay decreases to bring the incoming digits into alignment with locally generated digit times (referred to subsequently as "Decreased Delay Condition"). In like manner, should the incoming digit rate increase (or the locally generated digit rate decrease) the digit store will increase the storage delay (refererd to hereinafter as "Increased Delay Condition").

The toggle TR1 of the digit store reader LR is set at incoming digit pulse times *p*1 and reset at locally generated pulse times *t*1. Hence under the Normal Delay Condition of the digit store the setting and resetting pulses applied to the toggle TR1 are spaced by half a time slot and the square wave output from the toggle will have a 50:50 mark/space ratio which output the integrator INT1 converts into a zero level D.C. signal which is fed to the difference amplifier LDA and to input I1 of the integrator INT2. Assuming that the signal on input I2 is negative, then the output from the integrator INT2 will be positive and this output is converted by the slicer-amplifier LSA into a logical "0" on lead S1 and a logical "1" on lead S2.

At local digit pulse time *t*1 of local time slot *st*24, gates LG1 and LG2 are primed; since there is a logical "0" input to gate LG1, no resetting input is applied to toggle LCT but the logical "1" input to gate LG2 sets the toggle LCT. Thus, at digit time *t*1 of the next local synchronizing time slot *st*25, the gate LG3 is primed but receives no input and a logical "0" is transmitted over line LA. The set output from the toggle LCT changes the signal on input I2 of the integrator from negative to positive and hence the integrator output becomes negative. The slicer-amplifier now generates a logical "1" on lead S1 and a logical "0" on lead S2 and at digit time *t*1 of the time slot *st*24 of the next local time frame, gate LG1 is primed and applies a resetting input to the toggle LCT whilst no setting input is applied by gate LG2. In the following local synchronising time slot, at digit time *t*1, gate LG3 passes a logical "1" to the line LA. Meanwhile, the signal on input I2 of integrator INT2 has reverted to a negative polarity.

As long, then, as the digit store remains in a Normal Delay Condition, the encoder LC alternately sends a logical "1" and a logical "0" at digit times *t*1 of the synchronizing slots *st*25 and applies a zero level D.C. signal to the amplifier LDA.

The line equipment at the remote end of the link L is meanwhile operating in a similar manner and alternately sending encoded control signals, in the form of logical "1" and logical "0" signals to line. These signals are received by the line equipment EL at digit times *p*1 of the incoming synchronising time slots *sp*25. The encoded control signals are fed as input signals to a gate DG1, primed by a *p*1 pulse and an *sp*25 pulse, which is connected to the setting input of a toggle LDT which together with an integrator INT3 decodes the incoming control signals into a D.C. error signal which is applied as the other input to amplifier LDA. The toggle LDT is reset by the output of gate DG2 primed at digit time *p*8 of each incoming time slot *st*24, i.e. just prior to priming of the setting gate DG1. Thus, in the Normal Delay Condition of the digit store of the line equipment at the remote end of the line, the toggle LDT receives a setting input in alternate incoming time frames and hence generates a square wave output having a 50:50 mark/space ratio which is converted to a zero level D.C. error signal by the integrator INT3.

Under these Normal Delay Conditions, then, the amplifier LDA applies no frequency control signal to the exchange oscillator EO.

If the delay provided by the delay store to incoming digits reduces, the store is in the Decreased Delay Condition and there is less than a half-slot time difference between the pulse times *p*1 and *t*1 which set and reset the store reader toggle TR1. Thus, the mark/space ratio of the output from the toggle TR1 will decrease and the integrator INT1 generates a negative D.C. error signal the magnitude of which depends on the mark/space ratio of the integrator input. The input on lead I1 then is negative and once it is negative with respect to the signal on input I2, the coder gate LG3 sends a logical "1" to the line LA during a series of local synchronizing time slots *st*25.

Assume that the decrease in storage delay of the store was caused by a change in phase between the exchange oscillator EO and the exchange oscillator at the remote end of the link L. Whilst the coder LC is sending to line LA a series of logical "1" signals during subsequent local synchronizing time slots, due to shorter storage delay of the local digit store LDS, then there will be a corresponding increase in storage delay provided by the digit store of the remote line equipment so that the remote coder will send over the link L a series of logical "0" signals which will be received by the line equipment EL on the incoming line LB at digit times *p*1 of incoming synchronising time slots *sp*25. Thus, there will be no setting input applied by the gate DG1 to the decoder toggle LDT which will remain in a reset condition. The integrator INT3, under these conditions, generates a negative D.C. error signal which is fed to the difference amplifier LDA. The amplifier LDA thus receives two negative inputs and applies a control signal over filter EF to the oscillator EO so that the phase of the latter retards. At the same time, the exchange oscillator at the remote end of the link receives from its line equipment a phase advancing control signal. When the phase changes are sufficient to restore the storage delays provided by the store LDS to half a local time slot, the reader LR again generates a zero level D.C. error signal and the coder gate LG3 sends alternate logical "1" and "0" signals to line LA during subsequent local synchronizing time slots.

When the digit store LDS storage increases, and the store is in the Increased Delay Condition, the mark/space ratio of the store reader toggle TR1 increases and the integrator INT1 generates a positive output signal the magnitude of which is dependent on the mark/space ratio. The input I1 to the coder integrator INT2 is then positive and whilst it is positive relative to the I2 input, the coder gate LG3 sends a series of logical "1" signals to line LA during subsequent local synchronising time slots. If the increase in digit store delay is due to relative phase changes between the local and remote exchange oscillators, then the decoder LD receives a series of logical "1" signals during incoming synchronising time slots and feeds a positive D.C. error signal to the amplifier LDA. The local exchange oscillator then receives a phase advancing control signal whilst the remote exchange oscillator receives a phase retarding control signal. When the digit store LDS returns to the Normal Delay Condition, the coder gate LG3 again reverts to sending alternate logical "1" and "0" signals to line LA during local synchronising time slots.

From the above description of FIG. 3, it will be seen that the D.C. error signal generated by the reader LR has a magntiude and sign dependent on the magnitude and sense of any change from a mean condition of the digit store LDS. This error signal is applied directly to the difference amplifier LDA and also as an input to the coder LC. The magnitude of the error signal will depend on the magnitude of the condition giving rise to it, i.e. to the magnitude of change in the link transmission delay or of the magnitude of the relative phase change between the local and remote exchange oscillators. Thus, the error signal will persist for a time dependent on the magnitude of the error condition and correspondingly coded error signals will be sent to line by the coder LC for a time dependent on the magnitude of the error condition.

The frequency control of the exchange oscillator can be effected, for example, by use of a crystal oscillator having a variable capacitance diode connected in the crystal feedback circuit, the control signals controlling the capacitance of the diode. Alternatively, the control signals can operate a motor-driven capacitor in the crystal feedback circuit.

The timer LT normally also includes an alarm facility operable to generate an alarm signal when the timer is not synchronized to the train of incoming p.c.m. signals, for example due to a break in the incoming line LB. Under such condtions, no error signals are received from the digit store reader and the local digit store is inoperative. The alarm facility is arranged, when operated, to disable the outputs from the decoder LD and from the digit store reader LR and so prevent adverse operation of the digit store or of the exchange oscillator.

I claim:

1. A switching stage for a t.d.m. digital communications system, including a local master timing oscillator operable to determine at least local channel time slot and local digit times of said stage, said oscillator having a frequency control input, the frequency of said oscillator being adjustable by signals applied to said control input, at least one two-way communication link connected to said stage, the said stage having for each said communication link connected to it, separate digit storage means operably controlled by said master timing oscillator and digits incoming to the stage on said communication link temporarily to store said incoming digits thereby to absorb differences between incoming digit times and corresponding local digit times, sensing means operably responsive to the state of fill of said storage means to generate first D.C. error signals having a sign and magnitude dependent on the said state of fill of the storage means, means operable to encode said first error signals and to transmit said encoded signals to said communication link in selected outgoing channel slots, means operable to receive encoded first D.C. error signals from selected incoming channel slots on said communication link and to convert said received encoded signals into second D.C. error signals having opposite polarity to the D.C. error signals from which they originate and means connected to add algebraically the first and second D.C. error signals to produce a composite error signal and to apply said composite error signal to said frequency control input of the master oscillator in such a sense to change the frequency of said oscillator that the said composite D.C. error signal is reduced.

2. A switching stage as claimed in claim 1, wherein the said digit storage means is a series of toggle devices at least equal in number to the number of digits in a channel time slot, for each toggle an input gate and an output gate, each toggle being connected to apply an input to its said output gate when in a given one of its two states, means for operating said input gates individually at times corresponding to times of respective digits incoming on said communication link to said stage to switch said toggle to said given one state, and means for operating said output gates individually at times corresponding to said local digit times to gate said inputs received from said toggles at times always subsequent to said operation of the respective input gates, and means operable to switch the toggles from said one state subsequent to said operation of the respective output gates.

3. A switching stage as claimed in claim 2, wherein in a predetermined means operating condition of said digit storage means said sensing means is adapted to generate a zero level first D.C. error signal, and when the state of fill of said storage means changes from that corresponding to said predetermined operating condition said sensing means is adapted to generate a first D.C. error signal having a magnitude dependent on the magnitude of said change and a polarity dependent on the sense of said change.

4. A switching stage as claimed in claim 1, wherein said sensing means includes means operable to generate a square wave signal having a mark/space ratio dependent on the state of fill of said storage means, said square wave signal having a mark/space ratio of 50/50 when said state of fill corresponds to a predetermined operating condition of said storage means and said mark/space ratio changing in magnitude in dependence on the magnitude and sense of any change in said state of fill from that corresponding to said predetermined operating condition, and integrator means operable to convert said square wave signals to first D.C. error signals the magnitude and polarity of which are determined by the mark/space ratio of said square wave signals.

5. A switching stage as claimed in claim 1, in which said encoding means is adapted to convert said first D.C. error signals into binary digital form for transmission at a predetermined digit time of each of a succession of selected channel time slots, said encoding means being adapted to respond to first D.C. error signals signifying a state of fill of said storage means corresponding to a predetermined normal operating condition thereof to transmit binary digits alternately in said successive digit times, and to respond to first D.C. error signals signifying changes in the states of fill of said storage means from said predetermined condition to transmit a predominance of one or the other binary digit dependent on the sense of said change during a succession of said selected channel slots dependent on the magnitude of said change.

6. A switching stage as claimed in claim 5, wherein said receiving and conversion means is adapted to receive encoded first D.C. error signals in binary digital form at a predetermined digit time in each of a succession of selected incoming channel time slots, and includes means responsive to said received binary digital form signals to generate a square wave output having a mark/space ratio determined by the coding of said received signals representative of said first D.C. error signals, and means operable to convert said square wave output into said second D.C. error signals having a polarity opposite to that of the first D.C. error signals from which they originate.

7. In a t.d.m. digital communications system, a plurality of switching stages interconnected by two-way communication links, (a) each said switching stage including a local timing oscillator operable to generate time frames each comprising channel time slots containing cycles of local digits, said oscillator having a frequency control input, (b) each said switching stage including for each said communication link connected thereto:

(1) a separate digit storage means, (2) means operable under control of digits incoming to that stage on said communication link to insert said incoming digits into said storage means for temporary storage therein, (3) means operable under control of said local digits subsequently to remove said incoming digits from said storage means in time alignment with said local digits, (4) sensing means operably responsive to the state of fill of said storage means to generate a first D.C. error signal having a magnitude and polarity dependent on the said state of fill of the storage means, (5) means operable to encode said first D.C. error signals in digital form and to transmit said encoded signals to said communication link at digit times of selected outgoing channel time slots, (6) means operable to receive from said communication link in selected incoming channel time slots encoded first D.C. error signals and to convert said received encoded signals into second D.C. error signals having opposite polarity to the first D.C. error signals from which they originate, and (7) means connected to receive and add algebraically the first D.C. error signals generated by said sensing means and the second D.C. error signals generated by said receiving means to produce a composite error signal and to apply said composite error signal to said frequency control input of the master oscillator to change the frequency thereof such that the said composite D.C. error signal is reduced.

8. The combination claimed in claim 7, wherein the said encoding means includes gating means operable at a predetermined time in each of selected outgoing channel time slots from that stage to the said communication link to transmit to said link said encoded signals, said encoding means being adapted to respond to first D.C. error signals corresponding to a first state of fill representing a predetermined normal operating condition of said storage means to transmit alternately a logical "1" digit and a logical "0" digit to said link at said digit time in said selected channel time slots, and said encoding means further being adapted to respond to first D.C. error signals corresponding to changes in states of fill of said storage means from said first state of fill to transmit to said link a predominance of logical "1" digits or of logical "0" digits depending on the sense of said change at said predetermined digit time in a succession of said selected channel time slots dependent on the magnitude of said change.

9. The combination claimed in claim 7, wherein each said communication link includes for each direction of transmission a fixed transmission delay device such that in a predetermined normal operating condition of said link, the total transmission delay provided by said link and said fixed delay device added to half the maximum storage delay provided by said storage means equals an integral number of said time frames.

References Cited

UNITED STATES PATENTS

| | | | |
|---|---|---|---|
| 2,753,396 | 7/1956 | Gore | 178—69.5 |
| 3,209,265 | 9/1965 | Baker et al. | 328—72 X |
| 3,238,462 | 3/1966 | Ballard et al. | 328—72 X |
| 3,306,978 | 2/1967 | Simmons et al. | 179—15 |
| 3,311,442 | 3/1967 | Jager et al. | 325—63 X |
| 3,363,183 | 1/1968 | Bowling et al. | 178—69.5 X |
| 3,392,371 | 7/1968 | Sourgens | 340—146.1 |

FOREIGN PATENTS

| | | |
|---|---|---|
| 888,349 | 1/1962 | Great Britain. |
| 997,835 | 7/1965 | Great Britain. |

MALCOLM A. MORRISON, *Primary Examiner.*

CHARLES E. ATKINSON, *Assistant Examiner.*

U.S. Cl. X.R.

178—695; 179—15; 325—55; 328—63